(12) United States Patent
Divona

(10) Patent No.: US 9,039,105 B2
(45) Date of Patent: May 26, 2015

(54) VIDEO WALL COVER

(76) Inventor: Joseph Nick Salvator Divona, San Diego, CA (US)

(*) Notice: Subject to any disclaimer, the term of this patent is extended or adjusted under 35 U.S.C. 154(b) by 101 days.

(21) Appl. No.: 13/604,514

(22) Filed: Sep. 5, 2012

(65) Prior Publication Data

US 2014/0062270 A1    Mar. 6, 2014

(51) Int. Cl.
*A47B 5/00* (2006.01)
*H04N 5/64* (2006.01)
*A47B 81/06* (2006.01)

(52) U.S. Cl.
CPC ........ *H04N 5/64* (2013.01); *A47B 81/06* (2013.01); *Y10T 29/49947* (2015.01)

(58) Field of Classification Search
USPC ............ 312/7.2, 257.1, 223.1, 223.2; 40/603; 340/836, 840
See application file for complete search history.

(56) References Cited

U.S. PATENT DOCUMENTS

| | | | |
|---|---|---|---|
| 1,380,518 A * | 6/1921 | Bellig | 403/219 |
| 2,722,420 A * | 11/1955 | Adamson | 273/407 |
| 4,907,090 A | 3/1990 | Ananian | |
| 5,592,241 A | 1/1997 | Kita et al. | |
| 6,377,320 B1 * | 4/2002 | Ananian et al. | 348/836 |
| 6,750,922 B1 | 6/2004 | Benning | |
| 7,226,176 B1 | 6/2007 | Huang | |
| D612,818 S | 3/2010 | Lents, Jr. | |
| 7,733,642 B2 | 6/2010 | Liou et al. | |
| 7,974,004 B2 | 7/2011 | Maruyama | |
| 8,081,267 B2 | 12/2011 | Moscovitch et al. | |
| 8,102,483 B2 | 1/2012 | Perry et al. | |
| 8,169,702 B2 | 5/2012 | Kuroi et al. | |
| 8,184,213 B2 | 5/2012 | Yuzawa | |
| 8,212,959 B2 | 7/2012 | Miscovitch et al. | |

FOREIGN PATENT DOCUMENTS

WO    2009158548    12/2009

* cited by examiner

*Primary Examiner* — Matthew Ing
(74) *Attorney, Agent, or Firm* — Lewis Kohn & Walker LLP; Kent Walker; Kari Moyer-Henry

(57) ABSTRACT

A video display or screen cover which is preferably of a scale for covering large video walls (combinations of multiple video screens, such as in a matrix). The video display cover is for large screens and as such includes a series of coils and cords to fasten a transparent cover over a large expanse with sufficient surface tension to withstand contacts and blows from people and objects. The transparent cover is attached to a frame and the tension of the coils and cords applies surface tension to the surface of the transparent cover. The frame is preferably metal and sturdy and further has brackets to mount it to a wall.

4 Claims, 8 Drawing Sheets

VIDEO WALL COVER

FIELD OF THE INVENTION

The present invention relates generally to television display protection and more particularly to video screen and wall displays that provide a tensioned transparent cover over video displays and scoreboards to shield the displays from contact with projectiles and other potentially damaging items.

The preferred embodiment has a frame that encompasses the video screen, brackets in the corners for mounting to a wall and a system of coils and cords to fasten the transparent cover to the frame and add tension to the face of the cover.

BACKGROUND OF THE INVENTION

The statements in this section merely provide background information related to the present disclosure and may not constitute prior art.

Display protection devices have been used for many years to guard television screens and other delicate electronic display devices from being scratched, cracked, or otherwise damaged. These display devices over the years have become increasingly larger and more expensive and thus there exists a continuing demand and need to protect these larger electronic display devices from damage that is equivalent to the protection provided by small screen protection devices.

In addition, video walls and scoreboards are being designed with very expensive liquid crystal display (LCD), plasma, and light-emitting diode (LED) televisions organized in ever increasing numbers into rectangular grid patterns to produce single viewing displays with very large surface areas. The inventor has realized these larger surface area video walls and large video screens are much more difficult to protect with traditional television screen protection technology. The larger the surface area of the video wall, the higher the potential for the transparent protective sheet to flex inward, contact the display screen(s), and cause damage to the video wall when a projectile, such as a basketball, makes contact with the screen protection device.

Thus, it is an object of this invention to provide a protective covering for large video walls and video screens. It is another object of this invention to provide protective covering a large expanse of a video wall or screen with sufficient tension to deflect impacts from people, projectiles and such that otherwise would hit the display. It is another object of this invention to provide a tensioning mechanism for the cover that is adjustable.

SUMMARY OF THE INVENTION

In order to solve these and other needs in the art, the inventor hereof has succeeded in designing a video wall cover that in one exemplary embodiment includes a frame assembly made up of top, bottom, left and right angular sides. The angular sides define a rectangular region bound by a front, top, bottom, left and right plane, all having inner and outer surface panels, with a rear facing opening. The front plane is comprised of the front facing portions of all four angular sides. Mounting brackets, a face panel, and a face panel tensioning system are further included with the frame assembly. The face panel tensioning system is comprised of a series of high tensile cords and coils tied to, looped around or otherwise connected to tensioner brackets made of metal rods or bolts either welded or otherwise fastened at even intervals around the perimeter of and to the inner surface panel of the front plane and to the inner surface panel of the top, bottom, left or right plane perpendicular to the attachment point of the rod on the inner surface panel of the front plane.

For example, the face panel may comprise a transparent sheet of plastic like material (e.g. polycarbonate resin or Poly(methyl methacrylate) thermoplastics, etc). That material is positioned adjacent to the inner front plane, perpendicular to the inner facing top, bottom, left and right planes and contained within the rectangular region formed by these planes. The face panel has holes drilled at an offset distance from the outer edge of the face panel spaced evenly around the perimeter of the outside edge perpendicular to the tensioner bracket locations on the frame assembly. The cons and high tensile cords are attached between the holes on the outer edge of the face panel and the corresponding tensioner brackets on the frame assembly. This method of attachment of the face panel and frame assembly allows the face panel to be pulled by the coils and high tensile cords toward each corresponding top, bottom, left and right side and creates tension on the face panel so as to eliminate the possibility of the face panel flexing when struck by a projectile and causing damage to the video screen.

Further areas of applicability of the present invention will become apparent from the detailed description provided hereinafter. It should be understood that the detailed description and specific examples below, while indicating exemplary embodiments of the invention, are intended for purposes of illustration only and are not intended to limit the scope of the invention.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
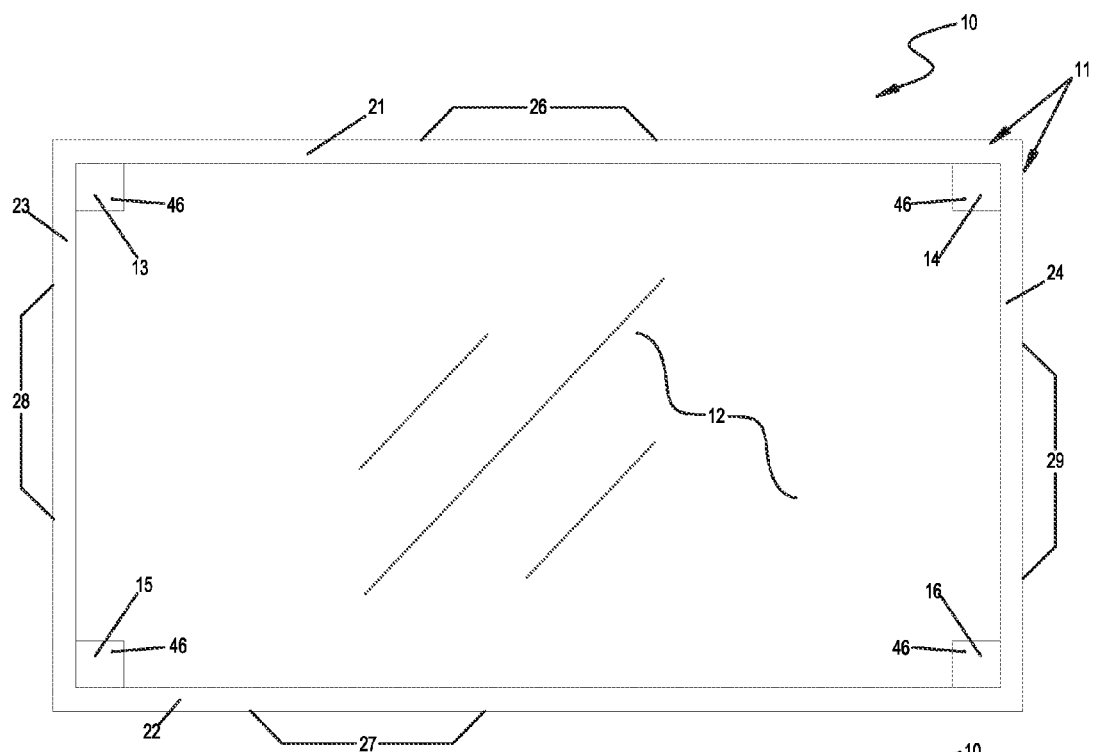
FIG. 1 is a front view of a video wall cover according to one embodiment of the present invention.

The following description of various embodiments is merely exemplary in nature and is in no way intended to limit the invention, its applications, or uses. Throughout the drawings, corresponding reference numerals indicate like or corresponding parts and features.

Figure 13:
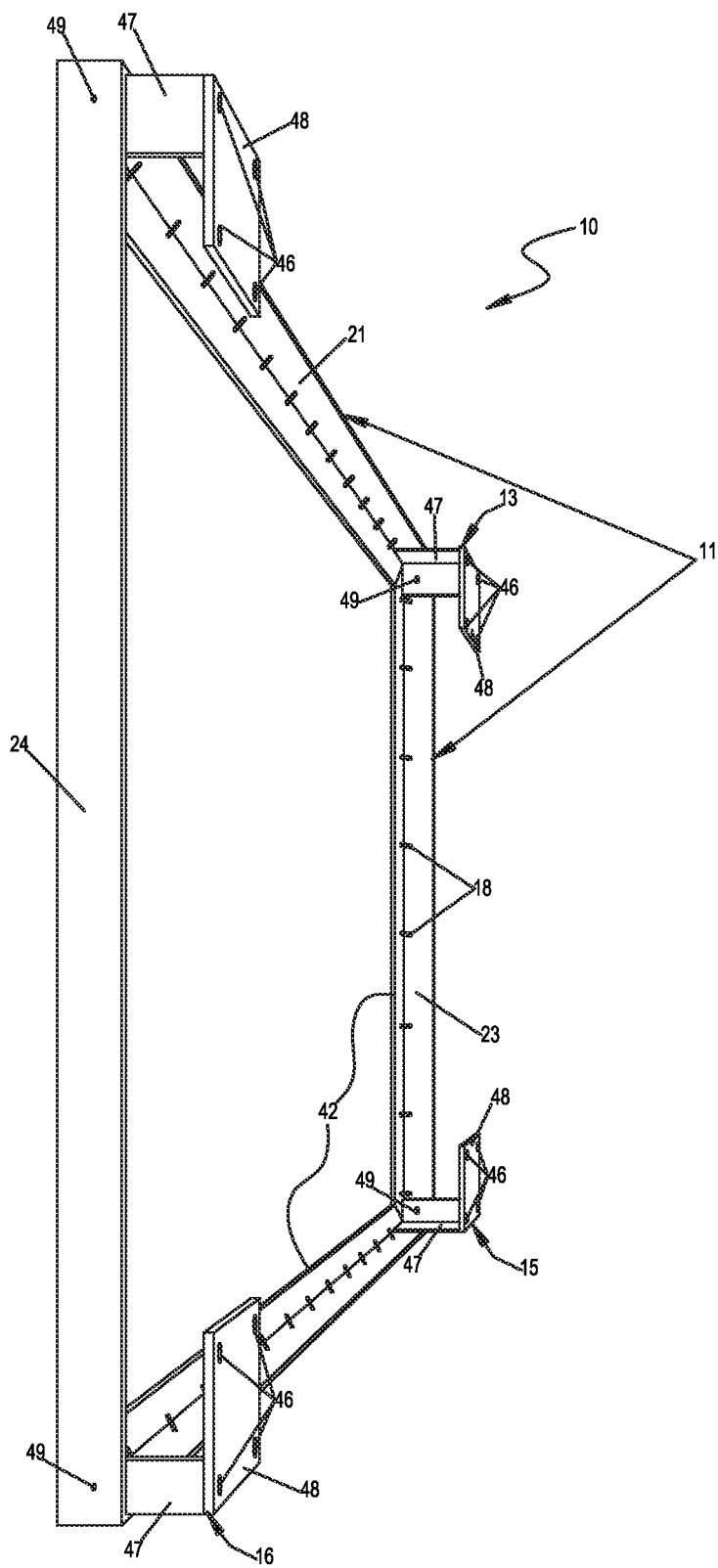
FIG. 13 is a back perspective view of the frame assembly of the video wall cover of FIG. 1 showing four corner mounting brackets.
Figure 14:
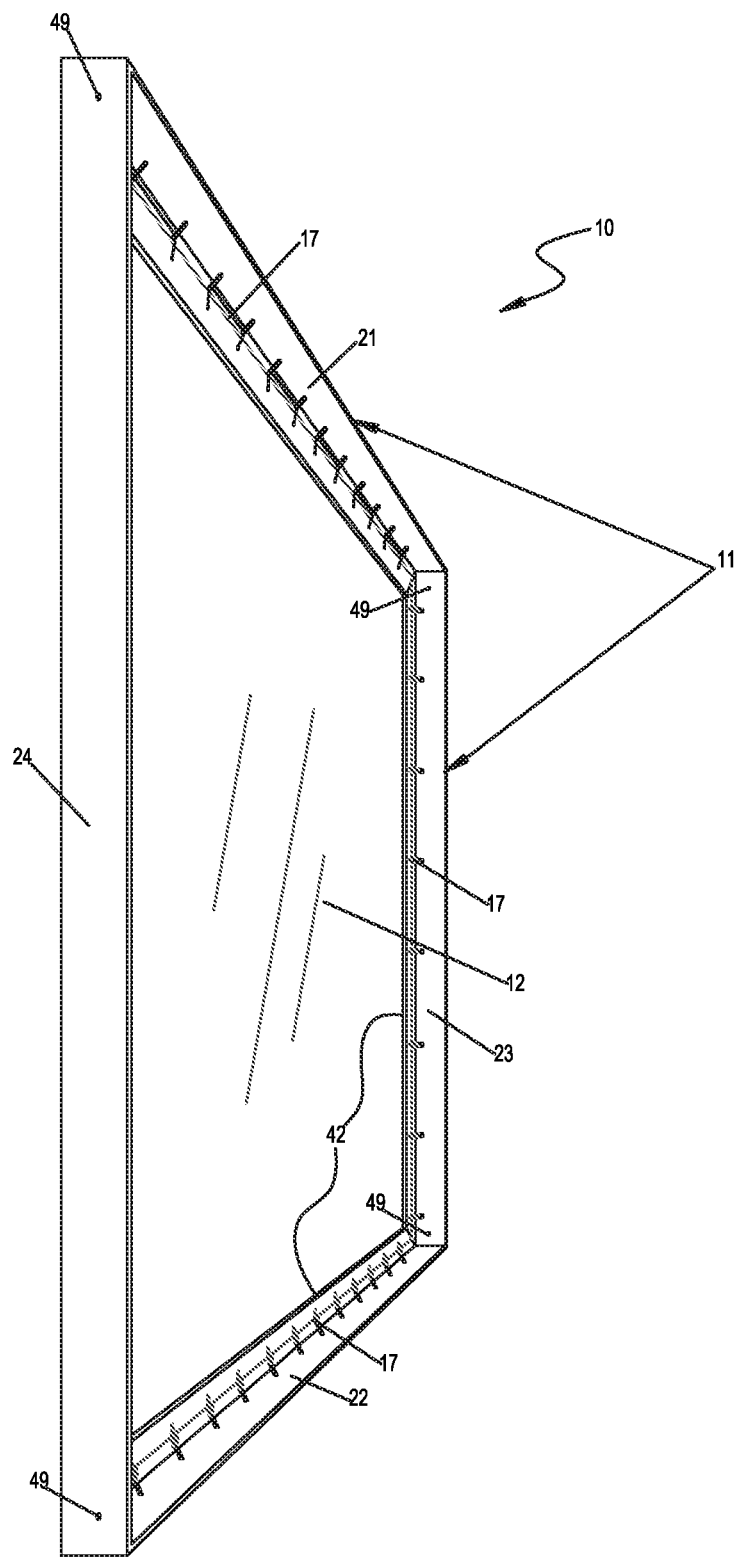
FIG. 14 is a back perspective view of the frame assembly of the video wall cover of FIG. 1 with the corner mounting brackets removed.

Referring to FIG. 13, there is shown a video display cover (also called a video wall cover and a video screen cover), generally indicated by reference number 10, according to one embodiment of the present invention from a perspective view. This and the remaining figures show the various elements in their entirety, including preferred and alternative embodiments. These embodiments show the invention covering a video wall in a three by three matrix.

Figure 2:
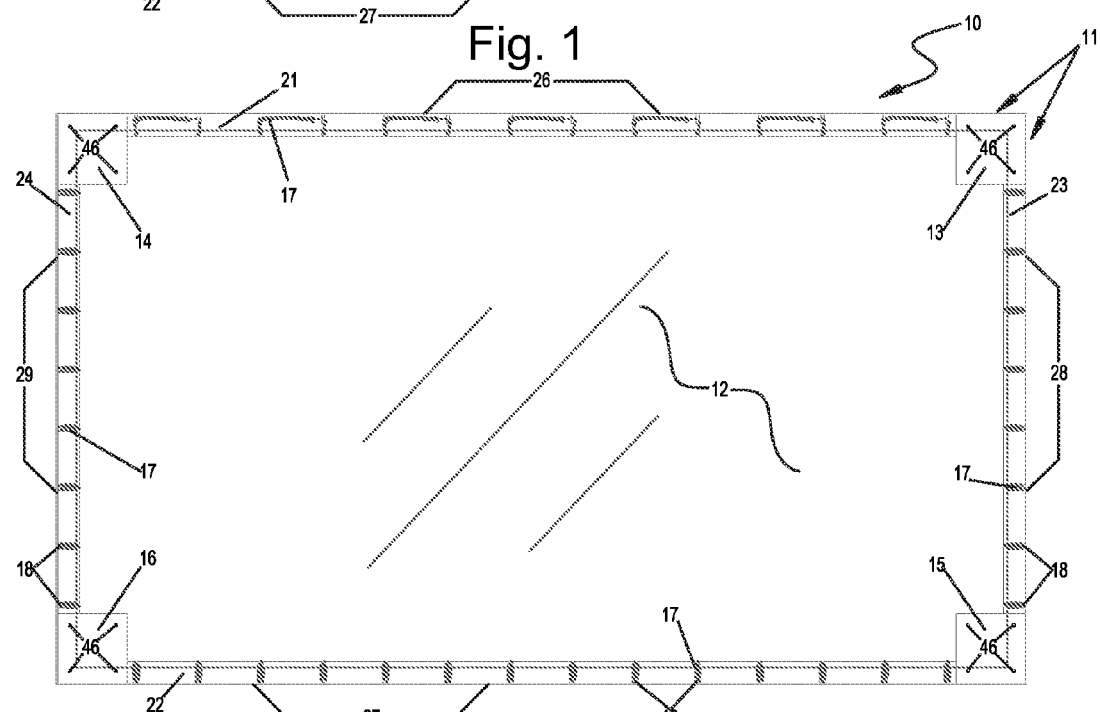
FIG. 2 is a rear view of the video wall cover shown in FIG. 1.
Figure 3:
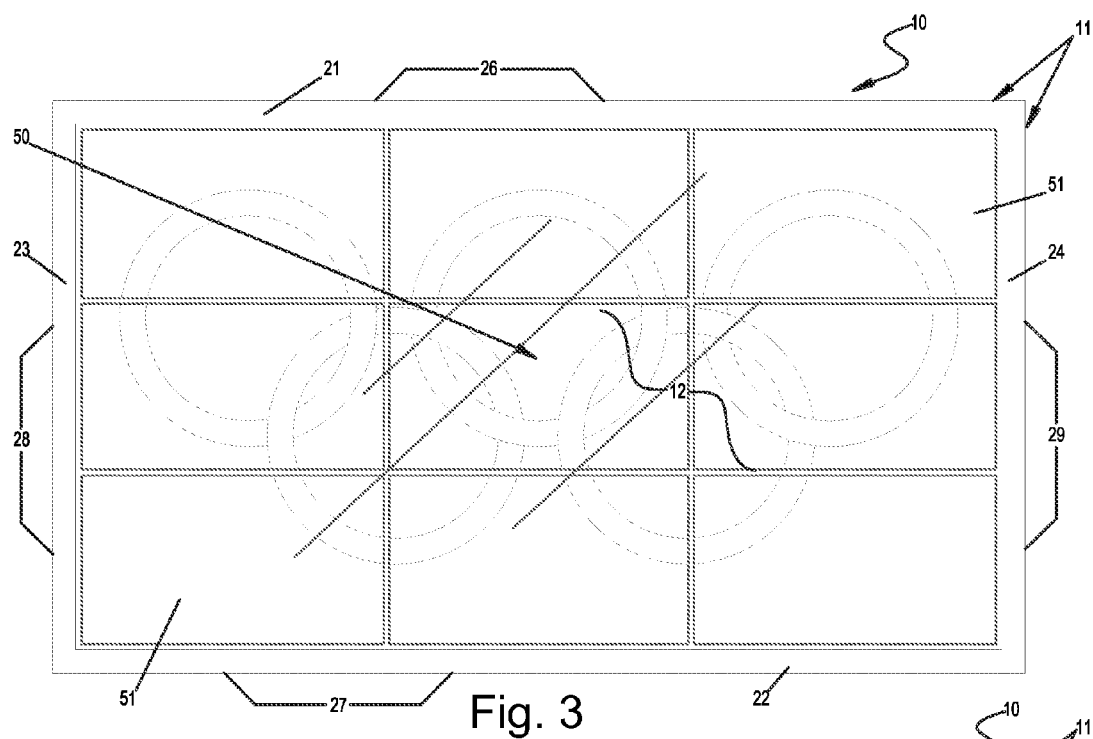
FIG. 3 is a front view of the video wall cover of FIG. 1 when installed over a 3×3 matrix video wall.
Figure 4:
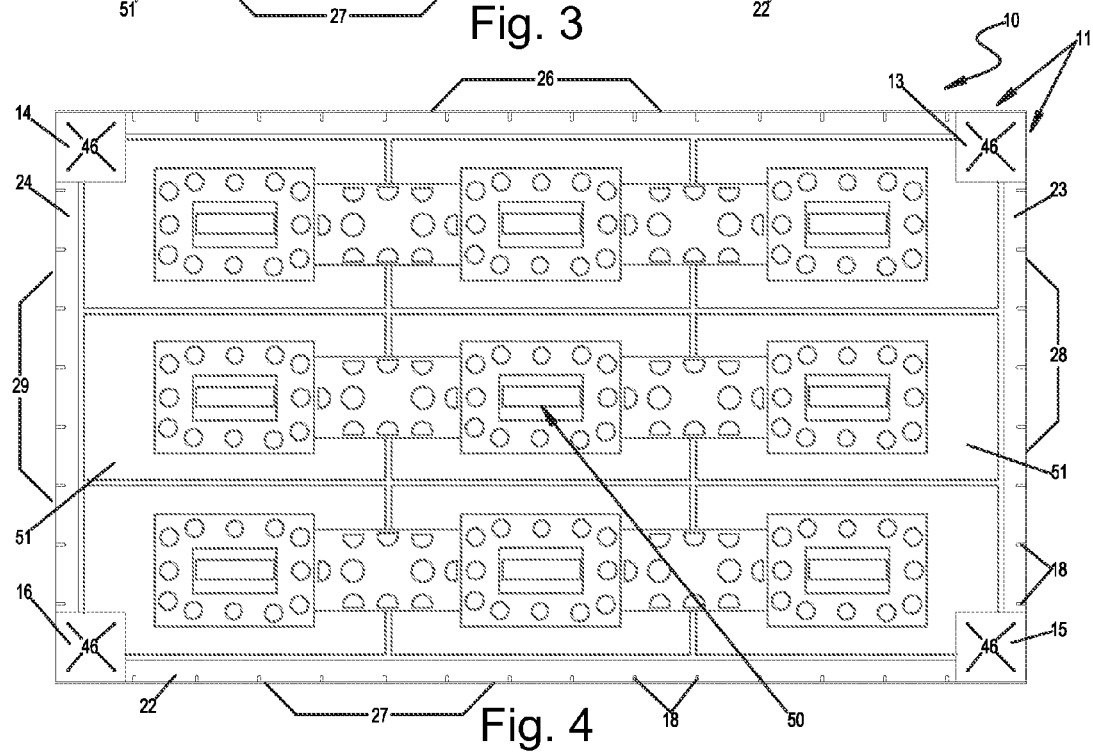
FIG. 4 is a back view of the video wall cover of FIG. 3.
Figure 5:
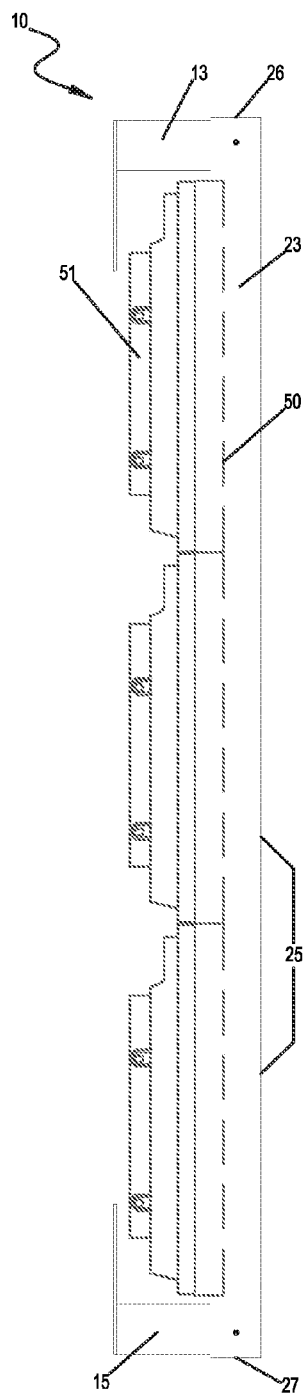
FIG. 5 is a left side view of the video wall cover of FIG. 3.
Figure 6:
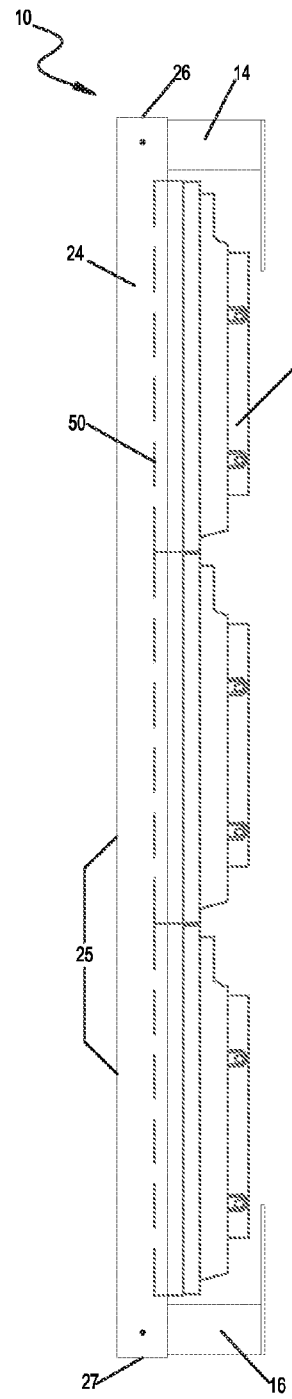
FIG. 6 is a right side view of the video wall cover of FIG. 3.
Figure 7:
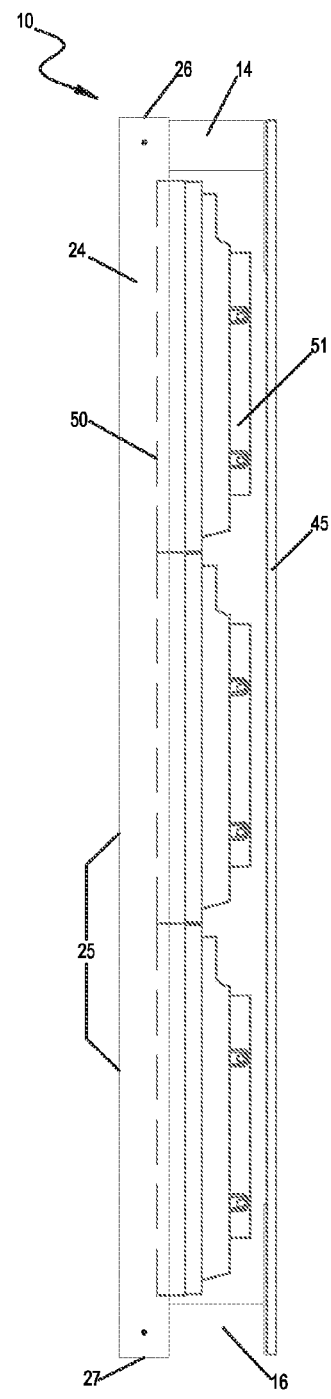
FIG. 7 is a right side view of the video wall cover of FIG. 3 when fastened to mounting plywood.
Figure 8:
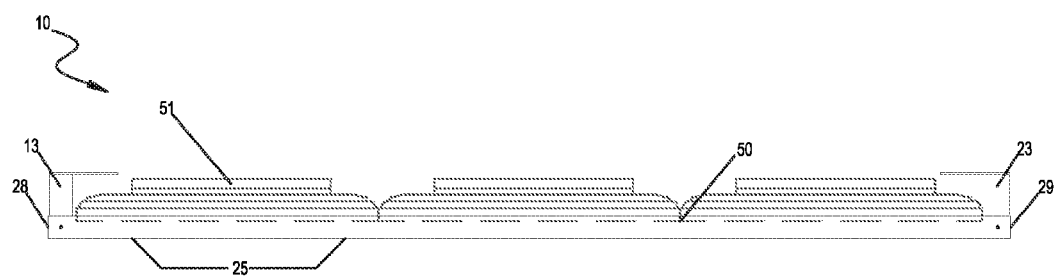
FIG. 8 is a top view of the video wall cover of FIG. 3.
Figure 9:
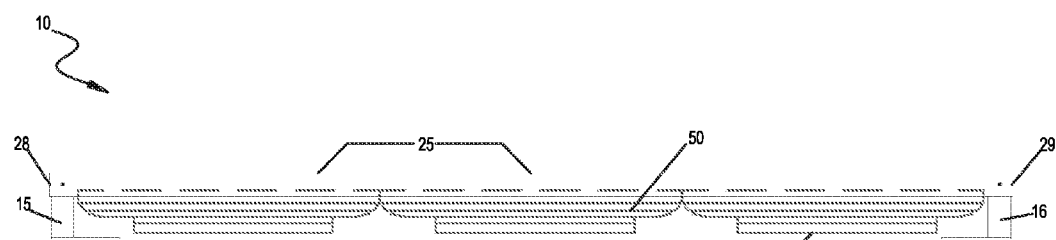
FIG. 9 is a bottom view of the video wall cover of FIG. 3.
Figure 10:
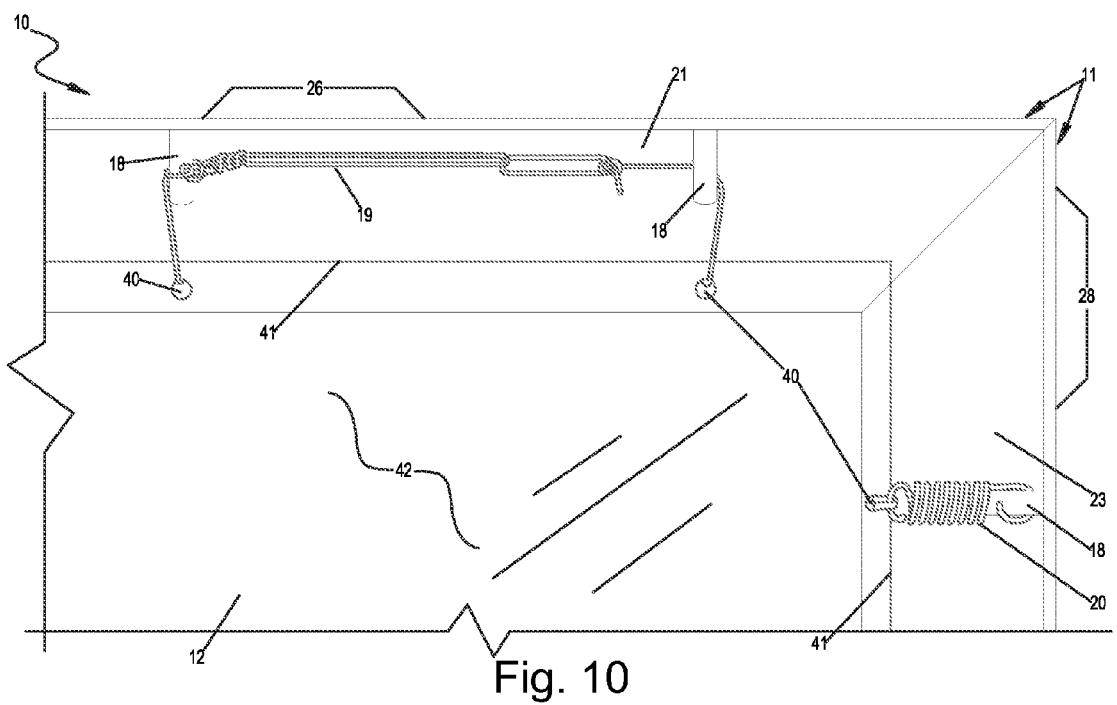
FIG. 10 is a back view of the top angular side of the frame assembly of FIG. 13 showing the face panel tensioning system where high tensile cord is used to hold the top edge of the face panel in a fixed position.
Figure 11:
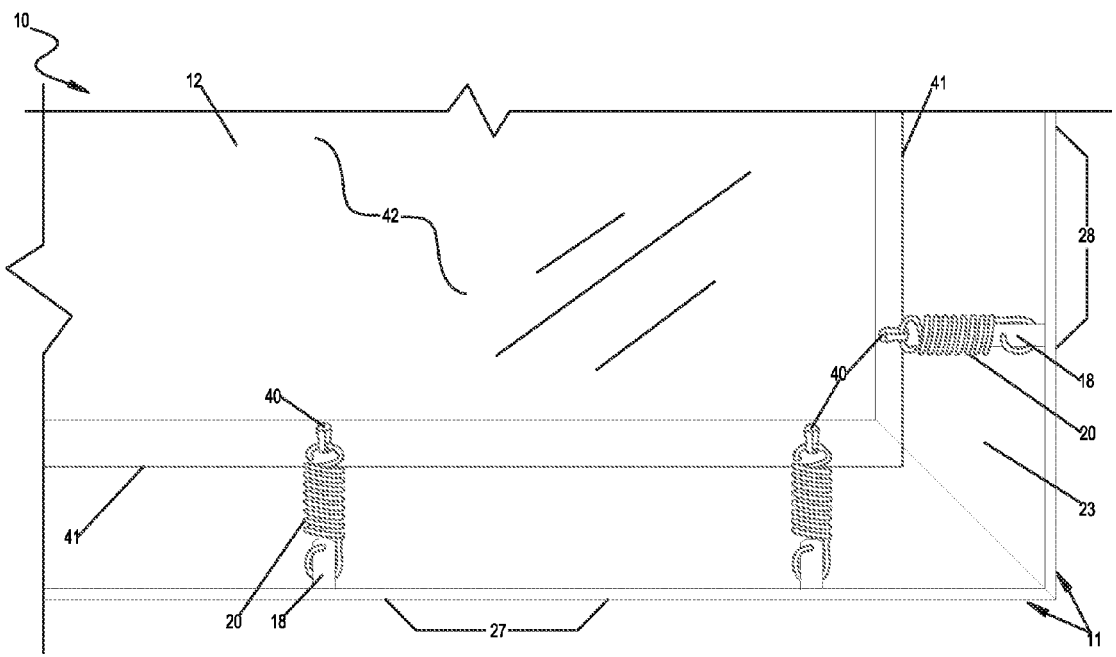
FIG. 11 is a back view of the bottom angular side of the frame assembly of FIG. 13 showing the face panel tensioning system where coils are used to pull the bottom edge of the face pan& away from the top edge of the face panel shown in FIG. 10 creating tension on the face panel.
Figure 12:
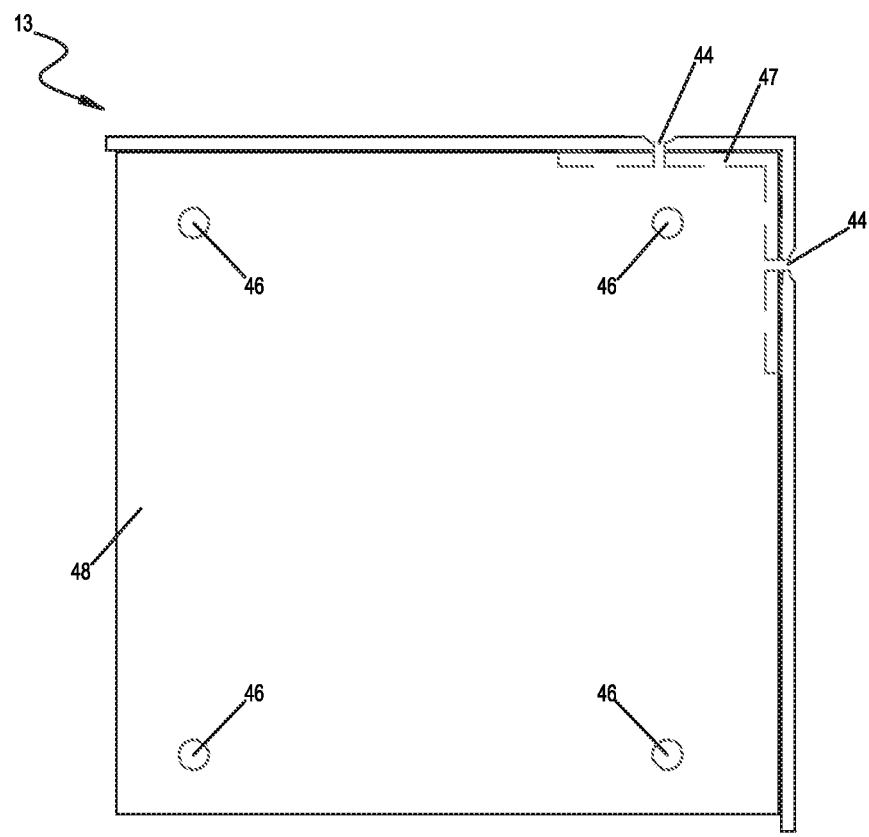
FIG. 12 is the back view of a corner mounting bracket shown in FIG. 13.

Accordingly, as shown in FIGS. 1 and 2 from the front and back respectively, the video wall cover 10 includes a frame assembly 11 which is comprised of a face panel 12, a top left mounting bracket 13, a top right mounting bracket 14, a bottom left mounting bracket 15, a bottom right mounting bracket 16, and a face panel tensioning system 17. As shown in FIGS. 3 and 4, front and back views when assembled with a video wall 50, the video display cover 10 includes several video displays 51 comprising the video wall 50 (e.g., nine displays assembled in a three by three matrix in this example), which can project a large, unitary image as a primary feature of video walls.

In the exemplary embodiment shown, the frame assembly 11 and face panel 12 are substantially rectangular shaped. It is to be understood, however, that any component described herein (e.g., frame assembly 11 and face panel 12) may comprise any of a wide range of other shapes including, but not limited to squares, circles, triangles, parallelograms, diamonds, semicircles, octagons, hexagons, ellipses, crosses or any other shapes that a video wall may comprise of.

Further, a wide range of materials may be used for the frame assembly 11 and mounting brackets 13-16, including, but not limited to; aluminum, titanium, steel; or any alloy thereof; plastic, carbon fiber, and fiberglass, among others.

Additionally, with respect to the structure of the frame assembly 11, this is shown for the exemplary embodiment in FIGS. 1, 2, 4-9, and 12-14. As shown, the frame assembly 11 is comprised of a top angular side 21, bottom angular side 22, left angular side 23 and right angular side 24. In the preferred embodiment the top, bottom, left, and right angular sides 21-24 are comprised of ¼ inch thick, 4 inch aluminum angle iron material. As such, for the preferred embodiment, the angular sides 21-24 are specific lengths cut at 45 degree angles so that when the end of each corresponding angular side is joined, the angular sides 21-24 form the shape of a rectangle and define a rectangular region bound by a front plane 25, top plane 26, bottom plane 27, left plane 28 and right plane 29, all having inner and outer surfaces, with a rear facing opening which will be large enough to encapsulate the video wall 50 to be protected. The front plane 25 of the frame assembly 11 is comprised of the front facing portions of all four angular sides 21-24 which define a front plane window 42 having an inside height and width. The angular sides can be joined by being welded, bolted, riveted, molded, pressed, shaped, manufactured or otherwise mechanically fastened together.

In addition, there may be less than or more than four angular sides in embodiments where the frame assembly 11 is other than rectangular in shape. For example, in a circular embodiment of the video wall cover 10 there would be one angular side comprising a circular angle iron piece defining a cylindrical region with a front plane and a side circular band. As another example, in a octagonal embodiment of the video display cover, there would be eight angular sides cut or tapered on each end at a 67.5 degree angle so that when joined the angular sides create a octagonal frame assembly defining a octagonal region bound by a front plane and eight side planes. In any embodiment, the angular sides are cut or tapered on each end at specified angles depending on the shape of the frame assembly 11. In addition, the front plane 25 of the frame assembly 11 is comprised of the front facing portions of the particular number of angular sides depending on the shape of the video display cover 10. Also, depending on the particular size of the video wall 50 to be protected, the angle iron material may be larger or smaller than the preferred embodiment which uses 4 inch angle iron.

With respect to the structure of the mounting brackets 13-16, this is shown for the exemplary embodiment in FIGS. 1, 2, 4 through 9, and 12 through 13. As shown, the mounting brackets 13-16 are comprised of a mounting plate 48 and a side member 47. The side member 47 is comprised of the same angle iron material as the frame assembly 11. In the preferred embodiment the mounting plate 48 comprises a ¼ inch thick, 1 square foot aluminum sheet. The mounting plate 48 will have a plurality of holes 46 through which the mounting brackets 13-16 can be bolted to the wall or structure 45 supporting the video wall. The mounting plate 48 may be smaller or larger than 1 square foot depending on the size of the video wall 50 to be protected. The side member 47 is joined to the corner of the mounting plate 48 by one end at a 90 degree angle to the mounting plate 48. In the preferred embodiment, the other end of the side member 47 of each mounting bracket 13-16 will be fastened to the inside surface of each corner of the frame assembly 11. The side member 47 of the mounting brackets 13-16 have lengths, that when mounted to the wall or structure 45, allows the frame assembly 11 to project outward from the wall or structure 45 past the display surface of the video wall 50 a distance that permits at least 1 inch of space between the inner surface of the face panel 12 and the display surface of the video wall 50.

With respect to the integration of the face panel 12, this is shown in the exemplary embodiment in FIGS. 1 through 11, 13 and 14. As shown, the face panel 12 is a rectangular sheet of transparent or mostly transparent sheeting material comprising of acrylic, plastic or glass. The sheeting material will be a type that is shatter resistant or shatter proof. For example the sheeting material may be comprised of polycarbonate resin thermoplastic, poly(methyl methacrylate) or shatter proof glass, among other suitable materials. In the preferred embodiment the face panel 12 is 3/16 inch thick having an outer edge 41 defining a height and width smaller than the rectangular region defined by the inner surfaces of the top 26, bottom 27, left 28 and right 29 planes and larger than the height and width of the front plane window 42. The face panel 12 is received by the frame assembly 11 and positioned adjacent to the inner surface of the front plane 25 of the frame assembly 11 and perpendicular to the inner surface of the top 26, bottom 27, left 28 and right 29 planes and contained within the rectangular region defined thereby. The face panel 12 will have a plurality of holes 40 drilled at an offset distance from its outer edge 41 at equal intervals around its perimeter to which the face panel tensioning system 17 will attach, enabling the face panel 12 to be fastened to the frame assembly 11.

With respect to the structure of the face panel tensioning system 17, this is shown for the exemplary embodiment in FIGS. 2, 4, 10, 11, 13 and 14. As shown, the face tensioning system 17 is comprised of a plurality of tensioner brackets 18, one or more lengths of high tensile cord 19 and a plurality of coils or springs 20. In the preferred embodiment, the tensioner brackets 18 are comprised of aluminum, titanium, steel, plastic, carbon fiber or fiberglass, although other suitable materials will suffice. In the preferred embodiment the tensioner brackets 18 are joined, at even intervals, to and around the perimeter of the inner surface of the front plane 25 and the inner surfaces of the corresponding top 26, bottom 27, left 28 and right 29 planes perpendicular to the attachment point of the tensioner bracket 18 on the front plane 25 inner surface.

Further, the tensioner bracket 18 attachment points are set at intervals equal to the drilled hole 40 intervals on the face panel outer edge 41 and adjacent thereto. The high tensile cord 19 is preferably comprised of small diameter rope, wire or twine made of plastic (including nylon), composite (e.g., with tensile strands) or metal, having a high tensile strength, although other suitable materials and cords could be used, such as metal, plastic or composite chains, metal, plastic or composite ties (e.g., twist ties, zip ties and lock ties (as for locking or tying down containers openings and lids) and metal, plastic or composite bands or straps. The high tensile cord 19 is tied between the tensioner brackets 18 attached to the top angular side 21 of the frame assembly 11 and the corresponding holes 40 in the top of face panel outer edge 41 allowing the face panel 12 to hang from the top angular side 21 in a fixed position. In other embodiments, the high tensile chord 19 may, in addition to, or instead of, being tied between the tensioner brackets 18 attached to the top angular side 21 and the corresponding holes in the top face panel edge 41, be tied between the tensioner brackets 18 along one or more of the other angular sides of the frame assembly 11 and the corresponding holes 40 perpendicular to those other angular sides.

In addition, the coils 20 may be comprised of metals, such as steel, iron, and titanium, or plastics and composites, among other materials, and are attached between the tensioner brackets 18 on the bottom 22, right 24, and left 23 angular sides and the adjacent holes 40 along the outer edge 41 of the face panel. Each coil 20 pulls the outer edge 41 of the face panel 12 towards the angular side the coil 20 is attached to and away from the opposing angular side of the frame assembly 11. In other embodiments coils 20 may also be used in combination with the high tensile cord 19 and be attached between all or some of the same tensioner bracket 18 and face panel hole 40 locations to which the high tensile cord 19 is attached. The attachment of the high tensile cord 19 and the coils 20 to the face panel 12 and the frame assembly 11 creates tension across the face panel 12 in all directions parallel to the front plane 25 of the frame assembly 11. This tension in the face panel 12 has a desired effect of increasing the rigidity of the face panel 12 and reducing its flex so as to eliminate the possibility of the face panel 12 flexing when struck by a projectile, making contact with the video wall 50 and causing damage to the video displays 51. The face panel tensioning system 17 can be installed on the varying frame assembly 11 shapes as mentioned herein and will create the same desired effect as described to protect the video wall as long as the face panel is attached to at least one side of the frame assembly in a fixed position.

The installation of the video display cover 10 has a specified order. First, the corner mounting brackets 13-16 are bolted to the wall or structure 45 which the video wall is to be mounted to. Then the video displays 51 of the video wall 50 are mounted to the wall or structure 45. Lastly, the video frame assembly 11 is hoisted and fastened to the mounting brackets 13-16 already attached to the wall or structure 45. This specified order of installation allows for simple removal and maintenance of the video display cover 10 and video displays 51 of the video wall 50.

In other embodiments, the video display cover 10 can be used to protect objects other than video walls, such as: scoreboards, murals, paintings, artwork, artifacts, clocks, and windows, among other things.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed:

1. A video wall cover providing display screen protection thereto, comprising:
    a frame assembly of sufficient size to surround a video wall;
    at least one face panel connected to the frame assembly;
    a plurality of mounting brackets connected to the frame assembly and mountable to a substrate surface; and
    a plurality of brackets connected to the frame assembly and the face panel, wherein the brackets are connected to the perimeter of the frame assembly and the perimeter of the face panel by a plurality of cords and coils;
    the plurality of cords connected to at least some of the brackets, wherein the cords are tied between the brackets and corresponding holes defined in a top edge of the face panel allowing the face panel to hang from a top angular side of the frame assembly in a fixed position; and
    the plurality of coils connected to at least some of the brackets, and further wherein the coils are attached to the brackets on bottom, right, and left angular sides of the face panel and adjacent holes defined along bottom, right, and left edges of the face panel.

2. The video wall cover of claim 1, wherein the plurality of brackets and coils create tension and rigidity across the face panel parallel to a front plane of the frame assembly by pulling edges of the face panel towards an angular sides of the frame assembly.

3. A video display cover that protects the video display, comprising:
    a frame assembly having top, bottom, left and right angular sides, wherein the angular sides each further have a first end and a second end;
    wherein the first end of each angular side is joined with the second end of the angular side perpendicular to it to define a rectangular region bound by a front, top, bottom, left and right plane, all having inner and outer surfaces, with a rear facing opening; and
    wherein the front plane is comprised of the front facing portions of all four angular sides;
    at least one face panel connected to the frame assembly and comprising sheet material sufficient to cover a display side of a video display and wherein the sheet material is a type of impact resistant acrylic, plastic or glass, wherein the face panel is received by the frame assembly and positioned adjacent to an inner surface of the front plane of the frame assembly and perpendicular to the inner surface of top, bottom, left and right planes of the front plane and contained within a rectangular region defined by the frame assembly and wherein the face panel further defines circular holes located at an offset distance from an outer edge of the face panel spaced evenly around the perimeter of the outside edge of the face panel, the face panel further overlaps an inside surface of the front plane by a distance at least equal to the offset distance from the outer edge of the face panel to the holes along the perimeter of the face panel;

a plurality of corner mounting brackets connected to the frame assembly, wherein the corner mounting brackets further comprise:

a mounting plate; and a side member;

wherein the side member has a first end and a second end;

wherein the corner of the mounting plate is connected to the inside surfaces of the second end of the side member at a 90 degree angle relative to the first and second ends of the side member;

wherein the first end of the side member connects to the top, bottom, left or right corners of the frame assembly; and wherein the mounting plate defines a plurality of holes through which the mounting plate can be bolted to the wall supporting the video wall; and a face panel tension device connected to the face panel and frame assembly, wherein the face panel tension device further comprises:

a plurality of tensioner brackets, wherein the tensioner brackets are joined, at even intervals, to and around the perimeter of the inner surface of the front plane and inner surfaces of the top, bottom, left and right planes perpendicular to attachment points of the tensioner bracket on the front plane inner surface; and wherein the tensioner bracket attachment points are at corresponding intervals to hole intervals defined on outer edges of the face panel and adjacent thereto;

a plurality of cords; and a plurality of coils;

wherein the cord further comprises rope or twine;

wherein the rope or twine has a high tensile strength;

wherein the cord is tied between the tensioner brackets and the corresponding holes defined in a top edge of the face panel allowing the face panel to hang from the top angular side in a fixed position.

4. The video display cover of claim 3, wherein the coils are attached between the tensioner brackets on the bottom, right, and left angular sides of the face panel and adjacent holes defined along the edges of the face panel; and wherein each coil creates tension across the face panel parallel to the front plane of the frame assembly by pulling an edge of the face panel towards an angular side to which each coil is attached and away from another angular side of the frame assembly.

\* \* \* \* \*